(12) United States Patent
Shesha et al.

(10) Patent No.: US 8,098,780 B2
(45) Date of Patent: *Jan. 17, 2012

(54) RAKE RECEIVER FINGER ASSIGNMENT BASED ON SIGNAL PATH CONCENTRATION

(75) Inventors: Thejaswi Bharadwaj Madapushi Shesha, Santa Clara, CA (US); Brian Dong, San Diego, CA (US); Messay Amerga, San Diego, CA (US); Chih-Ping Hsu, San Diego, CA (US); Parvathanathan Subrahmanya, San Jose, CA (US); Xiaoming Zhu, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/711,991

(22) Filed: Feb. 24, 2010

(65) Prior Publication Data

US 2010/0150212 A1 Jun. 17, 2010

Related U.S. Application Data

(63) Continuation of application No. 11/392,316, filed on Mar. 28, 2006, now Pat. No. 7,693,241.

(60) Provisional application No. 60/732,013, filed on Oct. 31, 2005.

(51) Int. Cl.
*H03D 1/06* (2006.01)

(52) U.S. Cl. ........................................................ 375/348

(58) Field of Classification Search .................. 375/150, 375/346, 347, 349, 342; 370/342, 335; 455/67.16, 455/75, 242.2, 458, 522
See application file for complete search history.

(56) References Cited

U.S. PATENT DOCUMENTS

| 6,731,622 | B1* | 5/2004 | Frank et al. ................. 370/342 |
| 7,305,022 | B2 | 12/2007 | Ogawa et al. |
| 2002/0024992 | A1 | 2/2002 | Ogawa et al. |
| 2003/0112776 | A1 | 6/2003 | Brown et al. |
| 2004/0072553 | A1* | 4/2004 | Wang et al. ................. 455/334 |
| 2005/0047485 | A1 | 3/2005 | Khayrallah et al. |

(Continued)

FOREIGN PATENT DOCUMENTS

JP 2002528993 9/2002

(Continued)

OTHER PUBLICATIONS

International Search Report and Written Opinion-PCT/US2006/060409, International Search Authority-European Patent Office-Apr. 18, 2007 (051294).

(Continued)

*Primary Examiner* — Khai Tran

(74) *Attorney, Agent, or Firm* — Kenneth K. Vu; Won Tae Kim

(57) ABSTRACT

A rake receiver finger assignor is configured to assign a rake receiver finger to a time offset between identified signal path time offsets in accordance with a concentration of identified signal paths from a transmitter to a rake receiver. In accordance with the exemplary embodiment, a number of identified signal paths having time offsets within a time window are observed to determine the concentration of signal paths identified by a path searcher. If the number of identified signal paths indicates a concentrated distribution of signal paths such as during a fat path condition, at least one rake finger is assigned between at a time offset between two identified signal paths.

28 Claims, 5 Drawing Sheets

U.S. PATENT DOCUMENTS

| | | | |
|---|---|---|---|
| 2005/0130616 A1* | 6/2005 | Khayrallah et al. | ....... 455/242.2 |
| 2007/0019585 A1 | 1/2007 | Chiu et al. | |

FOREIGN PATENT DOCUMENTS

| | | |
|---|---|---|
| JP | 2005518132 T | 6/2005 |
| KR | 100347655 | 7/2002 |
| TW | 229514 | 3/2005 |
| TW | 230521 | 4/2005 |
| TW | 241794 | 10/2005 |
| WO | WO00/25439 | 5/2000 |
| WO | WO02/056495 | 7/2002 |
| WO | WO03/069793 A1 | 8/2003 |
| WO | WO2005/022769 A1 | 3/2005 |

OTHER PUBLICATIONS

Simon V. et al: "A rake finger grid for asynchronous DS-CDMA systems using LMMSE tap weight estimation" VIC 2003-Spring. The 57th, IEEE Semiannual Vehicular Technology Conference. Proceedings, Jeju, Korea, Apr. 22-25, 2003, IEEE Vehicular Technology Conference, New York, NY: IEEE, US, vol. 4 of 4. Conf. 57, Apr. 22, 2003, pp. 2691-2695.

Taiwanese Search report-095140289-TIPO-Nov. 25, 2010(051294).

* cited by examiner

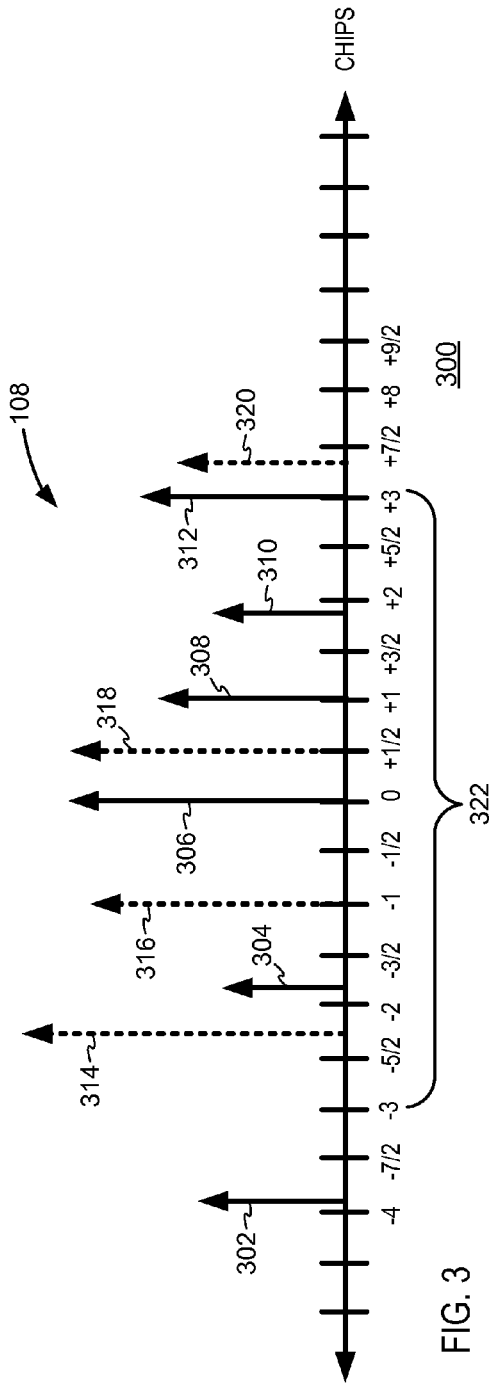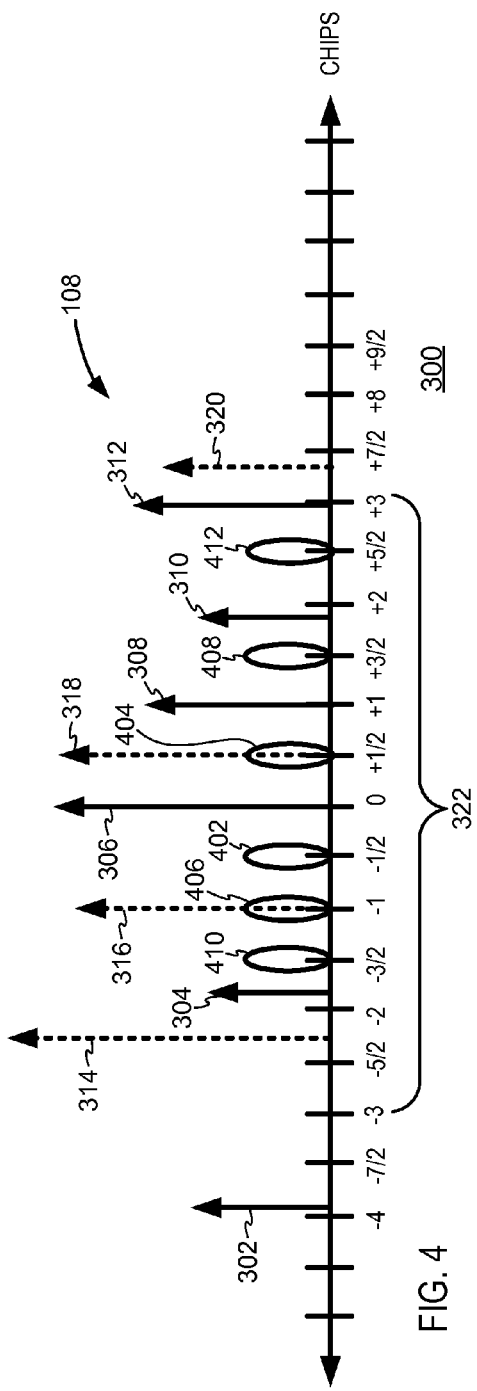

RAKE RECEIVER FINGER ASSIGNMENT BASED ON SIGNAL PATH CONCENTRATION

CLAIM OF PRIORITY UNDER 35 U.S.C. §120

The present application for patent is a continuation of patent application Ser. No. 11/392,316 filed Mar. 28, 2006, entitled, "Rake Receiver Finger Assignment Based On Signal Path Concentration," now U.S. Pat. No. 7,693,241, which claims priority to U.S. Provisional Patent Application Ser. No. 60/732,013, filed Oct. 31, 2005, entitled, "Finger Assignment For High Speed Paging Performance," now expired, and assigned to the assignee hereof and hereby expressly incorporated by reference herein.

FIELD

The present invention relates generally to wireless receivers, and more specifically to finger assignment in rake receivers based on signal path concentration.

BACKGROUND

In wireless communication systems, a signal transmitted from a transmitter is often subjected to dispersion, reflection, and fading resulting in multiple versions of the signal arriving at the receiver at different times. In direct sequence spread spectrum systems, rake receivers receive and combine the multiple time-shifted signals to receive the original transmitted signal. A conventional rake receiver includes multiple fingers where each finger includes a correlator synchronized to receive one of the time-shifted signals. A repeating pseudorandom code is applied to the incoming signal such that the bits of the pseudorandom code are aligned with the corresponding bits of the incoming signal. In order to assign each finger to a different signal of the time shifted versions, a searcher identifies the signal paths from the transmitter to the receiver. A pilot channel is often observed by the searcher to determine the time relationships between the multiple versions of the signal arriving at the receiver. In some situations, however, the searcher is not able to identify all of the paths in a short time. For example, time is often limited in identifying signal paths when user equipment (UE), such as an access terminal, comes out of sleep mode. In code division multiple access (CDMA) systems, the access terminal must wake up from a sleep mode periodically to demodulate a paging indicator channel to determine if an incoming call is arriving. In order to maximize battery life, the time that the access terminal is not in sleep mode is minimized resulting in a limited time for the searcher to identify the signal paths. In high speed fading scenarios, the searcher may not identify all useful signal paths in the time allowed.

Therefore, there is a need for rake finger assignment during high speed fading scenarios.

SUMMARY

A rake receiver finger assignor is configured to assign a rake receiver finger to a time offset between identified signal path time offsets in accordance with a concentration of identified signal paths from a transmitter to a rake receiver. In accordance with the exemplary embodiment, a number of identified signal paths having time offsets within a time window are observed to determine the concentration of signal paths identified by a path searcher. If the number of identified signal paths indicates a concentrated distribution of signal paths such as during a fat path condition, at least one rake finger is assigned at a time offset between two identified signal paths.

BRIEF DESCRIPTION OF THE DRAWINGS

FIG. 3 is a graphical illustration of an exemplary signal path distribution of a plurality of signal paths from a transmitter to a receiver.

FIG. 4 is a graphical illustration on the exemplary signal path distribution where rake fingers have been assigned to time offsets in a concentrated distribution.

DETAILED DESCRIPTION

Figure 1:
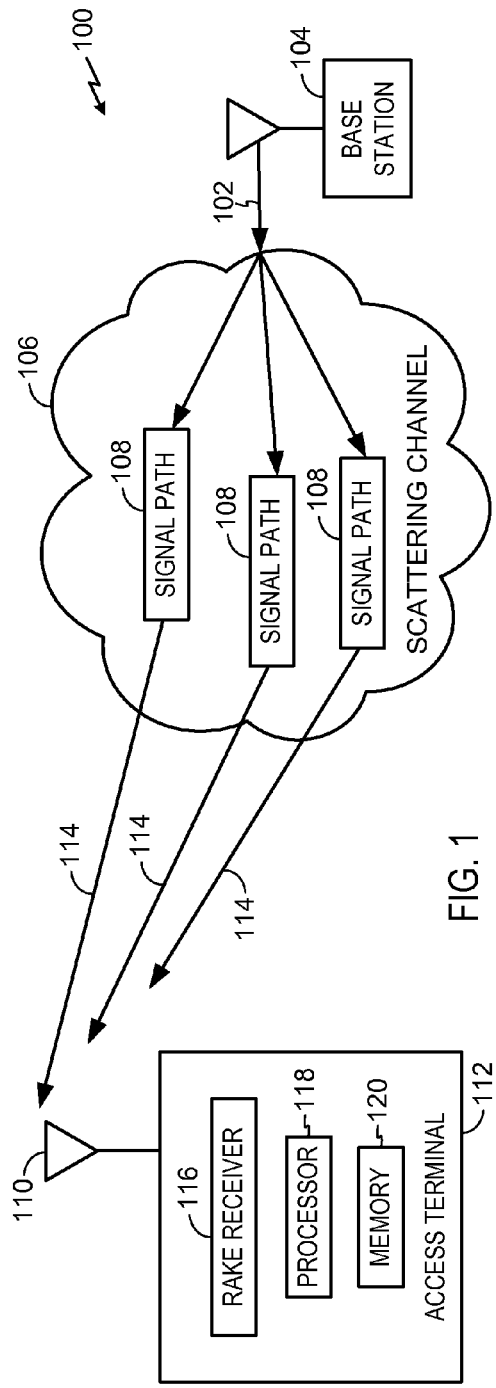
FIG. 1 is a block diagram of a communication system in accordance with the exemplary embodiment of the invention.

FIG. 1 is a block diagram of a communication system in accordance with the exemplary embodiment of the invention. The word "exemplary" is used herein to mean "serving as an example, instance, or illustration." Any embodiment described herein as "exemplary" is not necessarily to be construed as preferred or advantageous over other embodiments. A signal 102 transmitted by a base station 104 through a scattering channel 106 takes a plurality of paths 108 to an antenna 110 of an access terminal 112 due to reflection, diffraction and local scattering. The different lengths of the signal paths 108 result in multiple signal versions 114 of the signal 102 arriving at the access terminal 112 at different times and with different amplitudes.

Although the access terminal 112 is a portable communication device such as a cellular telephone or wireless personal digital assistant (PDA) in the exemplary embodiment, the access terminal 112 may be any device that includes a receiver for receiving the signal 102. The access terminal 112 may include other hardware, software, or firmware not shown in FIG. 1 for facilitating and performing the functions of the access terminal 112. For example, the access terminal 112 may include input and output devices such as keypads, displays, microphones and speakers.

The access terminal 112 includes hardware and software that includes at least a rake receiver 116. In the exemplary embodiment, software code running on the processor 118 facilitates the execution of at least some of the functions described herein as well as facilitating the overall functionality of the access terminal 112. Data, code and other information may be stored in a memory 120. The various functional blocks of the access terminal 112 may be implemented using any combination of hardware, software and/or firmware. Further, the various functions and operations may be implemented in any number of devices, circuits, or elements. Two or more of the functional blocks may be integrated in a single device and the functions described as performed in any single device may be implemented over several devices in some circumstances. For example, at least some of the functions of the rake receiver 116 may be performed by the processor 118.

As described below in further detail, with reference to the exemplary embodiment of the invention, rake receiver fingers are assigned in accordance with a concentration of the time offset versions 114 of the signal 102 within a time window. A path searcher identifies a plurality of signal paths from the transmitter (104) to the rake receiver 116 where each signal path 114 has a relative time delay (time shift or time offset) to the other signal paths 108. A fat path detector determines that a fat path condition exists at least partially based on the number of signal paths (114) having relative time offsets within the time window. In the exemplary embodiment, the fat path detector includes a detection filter that produces a fat path indicator based on previous fat path indicators and a number of signal paths within the time window. If the fat path indicator is greater than a fat path threshold, the fat path detector determines that a fat path condition exists and the rake receiver fingers are assigned in a concentrated distribution where at least one rake receiver finger is assigned between two signal paths. In the exemplary embodiment, rake receiver fingers are assigned to the identified signal paths and remaining fingers are assigned at half-chip intervals from the signal path having the least loss.

The exemplary finger assignment provides increased receiver performance by maximizing the number of signal paths used for demodulating a received signal. The finger assignment is particularly useful in wide-band CDMA (WCDMA) user equipment (UE), such as an access terminal 112, for increasing reception of paging channels when the UE periodically comes out from sleep mode to determine if a call is arriving.

Figure 2:
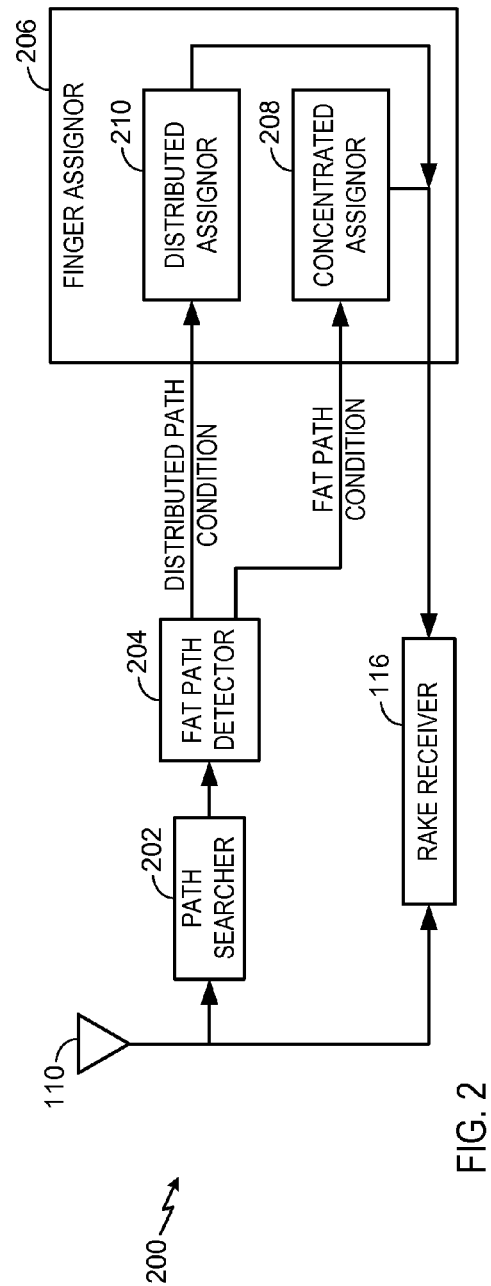
FIG. 2 is a block diagram of receiver system in accordance with the exemplary embodiment of the invention.

FIG. 2 is a block diagram of receiver system 200 in accordance with the exemplary embodiment of the invention. The various functional blocks may be implemented in any combination of hardware, software and/or firmware. Functions described as performed by multiple blocks may be performed in a single device and functions described as performed in a single block may be implemented over several devices. In the exemplary embodiment, the receiving system 200 is implemented as part of a UE communication device such as an access terminal 112 for operation within a spread spectrum wireless communication system such as a system operating in accordance with wide-band code division multiple access (WCDMA) techniques. Accordingly, the transmitting source in the exemplary embodiment is a base station 104 and the rake receiver system 200 is implemented within the access terminal 112 in the exemplary embodiment.

As explained above, fingers of a rake receiver 116 are assigned based on a concentration of signals paths having relative time offsets within a time window. The exemplary receiver system 200 includes a rake receiver 116, a path searcher 202, a fat path detector 204, and a finger assignor 206. The path searcher 202 identifies a plurality of signal paths (108) from the transmitter (104) to the rake receiver system 200 based on time shifted versions of a pilot signal received at the rake receiver system 200. An example of suitable searcher includes a correlator that correlates the incoming data stream (received signal) with a local copy of the pseudo-random noise (PN) sequence of the pilot channel (CPICH). The pilot signal transmitted from the base station 104 arrives at the rake receiver system 200 as time shifted versions of the original pilot signal. The path searcher 204 determines the energy level and relative time offset of a plurality of time shifted signals to identify signal paths (108) from the transmitter (104) to the receiver system 200. In order to increase battery life, the access terminal 112 is placed in a sleep mode where processor 118 activity is limited and receiver functions are at least partially disabled. In CDMA systems, a paging indicator such as a signal sent over the Paging Indicator Channel (PICH) in CDMA systems is transmitted to the access terminal to alert the access terminal 112 to an arriving call. In order to determine if a call is arriving, the access terminal 112 periodically disrupts sleep mode to demodulate the paging indicator channel. If the paging indicator indicates a call is arriving, the access terminal 112 proceeds to demodulate other signals such as the paging channel (PCH) to obtain other information to answer the call. Battery life is maximized by minimizing the time required to come out of sleep mode, demodulate the paging channel and return to sleep mode. Accordingly, the time allowed for searching for signal paths is limited and often results in one or more signal paths remaining unidentified by the searcher in conventional systems. During fat path conditions, multiple signal paths are separated by relatively small time differences. Some signal paths between the identified signal paths are often not identified during fat path conditions. In accordance with the exemplary embodiment, the rake receiver fingers are assigned between identified signal paths in a concentrated distribution. Receiver performance is improved since signals arriving through at least some of the unidentified signal paths contribute to the combined signal in the rake receiver 116. In the exemplary embodiment, the time used by the searcher 202 to observe the incoming signal versions is selected to maximize performance without incurring significant wake times. In some circumstances, the searcher 202 may search "deeper" than conventional Universal Mobile Telecommunications System (UMTS) searchers in an attempt to detect weaker paths.

The fat path detector 204 detects a fat path condition based on information provided by the searcher 202 and generates a fat path indicator where the indicator indicates a fat path condition or a distributed path condition depending at least partly on the concentration of identified signal paths. In the exemplary embodiment, the fat path detector 204 includes an Infinite Impulse Response (IIR) filter and an evaluator. Other devices and filters may be used in some circumstances. An example of another suitable filter includes a Finite Impulse Response (FIR) filter. Outputs of the FIR filter may be averaged over several values in some circumstances.

The IIR filter generates a filter output based on the number of identified signal paths within a time window and a previous filter output. In the exemplary embodiment, the previous value and the number of paths is weighted and combined to produce the filter output. If fat path detector indicates a fat path condition, the finger assignor 206 invokes a concentrated assignor 208 that assigns rake receiver fingers in a concentrated distribution. Otherwise, the finger assignor invokes the distributed assignor 210 that is in accordance with conventional techniques of rake receiver assignment.

FIG. 3 is a graphical illustration of an exemplary signal path distribution 300 of a plurality of signal paths 108 from a transmitter 104 to a receiver 116. The plurality of signal paths 108 includes identified signal paths 302-312 and unidentified signal paths 314-320. In FIG. 3, each of the solid line arrows (302-312) represents an identified signal path identified by a searcher and each dotted arrow (314-320) represents an existing unidentified path that was not identified by the searcher. The heights of the arrows indicate the relative loss of the signal paths where a height of an arrow is inversely proportional to the loss of the signal path. The heights of the arrows are therefore representative of the energy of pilot signal received at the receiver 116 such as the Ec/Io, the ratio in (dB)

between the pilot energy accumulated over one PN chip period (Ec) to the total power spectral density in the received bandwidth (Io). The signal paths 302-320 have a time offsets relative to each other indicated in units of chips in FIG. 3. After the searcher 202 identifies the signal paths 302-312, the fat path detector 204 identifies the largest energy signal path 306 (reference path 306) and determines the number of identified signal paths (304-312) within a time window 322. The time window 322 in the exemplary embodiment is +/−3 chips from the reference path 306. In the example provided in FIG. 3, five signal paths 304-312 are identified within the time window 322. The fat path detector 204 determines that a fat path condition exists based at least partially on the number of identified paths 304-313 within the time window 322 ("identified time window paths 304-312"). As discussed in further detail with reference to FIG. 5, the fat path detector 204 determines whether the fat path condition exists based on a previous output of a detection filter in the exemplary embodiment.

FIG. 4 is a graphical illustration on the exemplary signal path distribution 300 where rake fingers have been assigned to time offsets in a concentrated distribution. If the fat path detector detects a fat path condition, the rake fingers are assigned at offsets between at least some of the identified signal paths 302-312. In the exemplary embodiment, rake fingers are first assigned to the identified signal paths 302-312 before assigning fingers at half chip offsets from the reference path 306. For the example of FIG. 4, rake fingers are assigned at the reference path 306 (0 chip offset) and at −4, −2, +1, +2, and +3 chip offsets where signal paths were identified. Signal paths may not have offsets at the ½ chip intervals but the searcher resolution provides searcher results in terms of integer chip values. Remaining rake fingers are assigned at ½ chip increments from the reference path 306 to unassigned ½ chip signal path offsets. Assigned rake fingers of the remaining rake fingers are illustrated as ovals 402-412 in FIG. 4. Therefore, in the example of FIG. 4, remaining rake fingers 402-412 are assigned to −½ chip offset 402, the +½ chip offset 404, the −1 chip offset 406, the +1½ chip offset 408, the −1½ chip offset 410, and the +3½ chip offset 412. As illustrated in the example, fingers assigned to the −½ chip and the −1 chip offsets will receive signals within signal paths not identified by the searcher 202.

Figure 5:
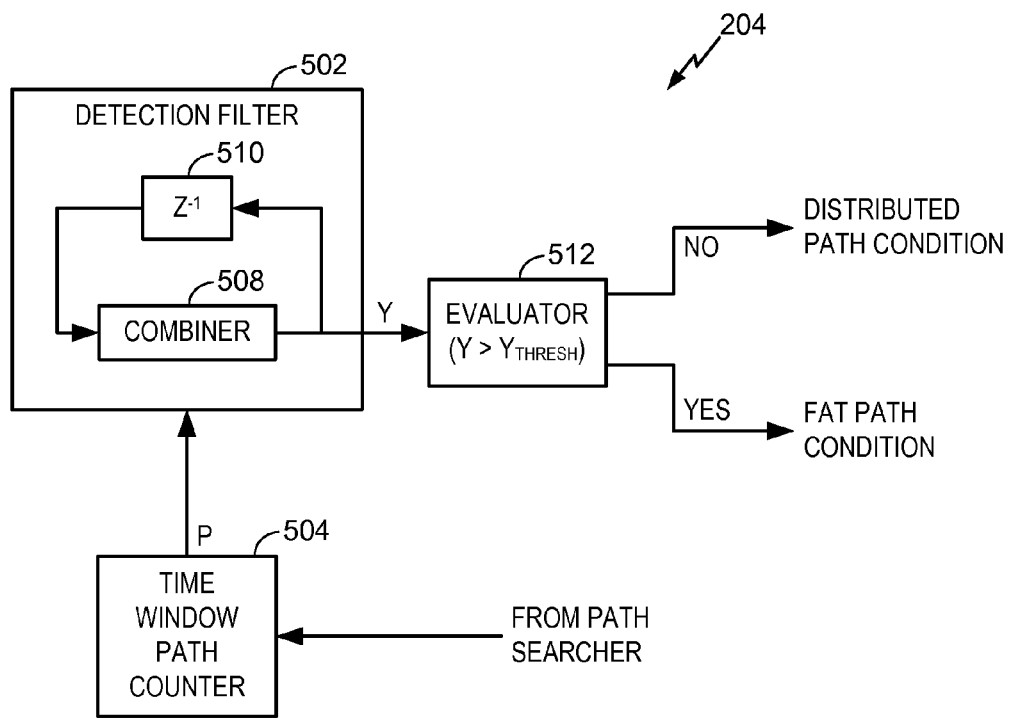
FIG. 5 is block diagram of an exemplary fat path detector in accordance with the exemplary embodiment of the invention.

FIG. 5 is block diagram of an exemplary fat path detector 204 in accordance with the exemplary embodiment of the invention. The various functional blocks illustrated in FIG. 5 may be implemented using any combination of hardware, software and/or firmware. Further, the various functions and operations may be implemented in any number of devices, circuits, or elements. Two or more of the functional blocks may be integrated in a single device and the functions described as performed in any single device may be implemented over several devices in some circumstances. In the exemplary embodiment, the fat path detector 204 is implemented by running software code on the processor 118.

Although the fat path detector 204 may be implemented in other ways, the fat path detector 204 includes a detection filter 502 in the exemplary embodiment. The output of the detection filter 502 depends on the current number of identified time window paths 304-312 and the previous value of the output of the filter. A time window path counter 504 provides an output, path number (P), that indicates the current number of identified time window paths 304-312 identified by the searcher 202 as being within the time window 322. A combiner 508 combines a previous filter output with P to produce the filter output, y. Each output of the detection filter 502 is a function of wakeup occurrences (n), where a wakeup occurrence occurs when the access terminal 112 comes out of sleep mode to monitor the paging channel. The output y of the filter is delayed by a delay 506 before being fed back into the input of the combiner 508. The delay in the exemplary embodiment is single wakeup occurrence resulting in the previous filter output. Other delays may be used in some circumstances. In the exemplary embodiment, combiner is a weighted combiner such that the detection filter 502 has response in accordance with $$y(n)=0.95y(n-1)+0.05P(n) \tag{1}$$

where n is the count of wake occurrences from sleep mode and P is the number of identified paths within the time window 322 during a wake up instance (n). Other weighting functions as well as other values may be used in the response of the filter. For example, values other than 0.05 and 0.95 may be used in some circumstances.

The evaluator 512 evaluates the output of the detection filter to determine whether a fat path condition exists. In the exemplary embodiment, the evaluator 508 compares the output (y) of the detection filter 502 to a threshold $y_{THRESH}$. If the output is greater than the threshold, the evaluator 512 and the fat path detector 204 indicate a fat path condition. Otherwise, a distributed path condition is indicated. In the exemplary embodiment, the fat path detector is initialized at power up and during other appropriate times by setting the initial filter output equal to one (y(0)=1). Although other thresholds may be used in some situations, $y_{THRESH}$ is equal to 0.5 in the exemplary embodiment. As discussed below, the filter output converges to the appropriate level after several wakeup occurrences.

Figure 6:
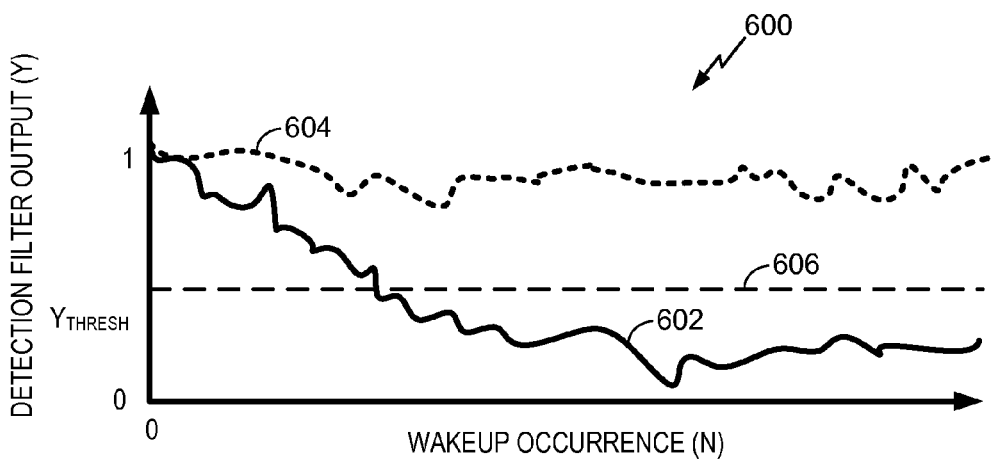
FIG. 6 is a graphical illustration of examples of detection filter outputs as a function of wakeup occurrences.

FIG. 6 is a graphical illustration 600 of examples of detection filter 502 outputs as a function of wakeup occurrences. Since the detection filter is initialized to one n the exemplary embodiment, the curves 602, 604 begin at y=1 for n=0. A distributed path curve 602 eventually drops below the threshold 606. The fat path curve 604 remains above the threshold 606.

Figure 7:
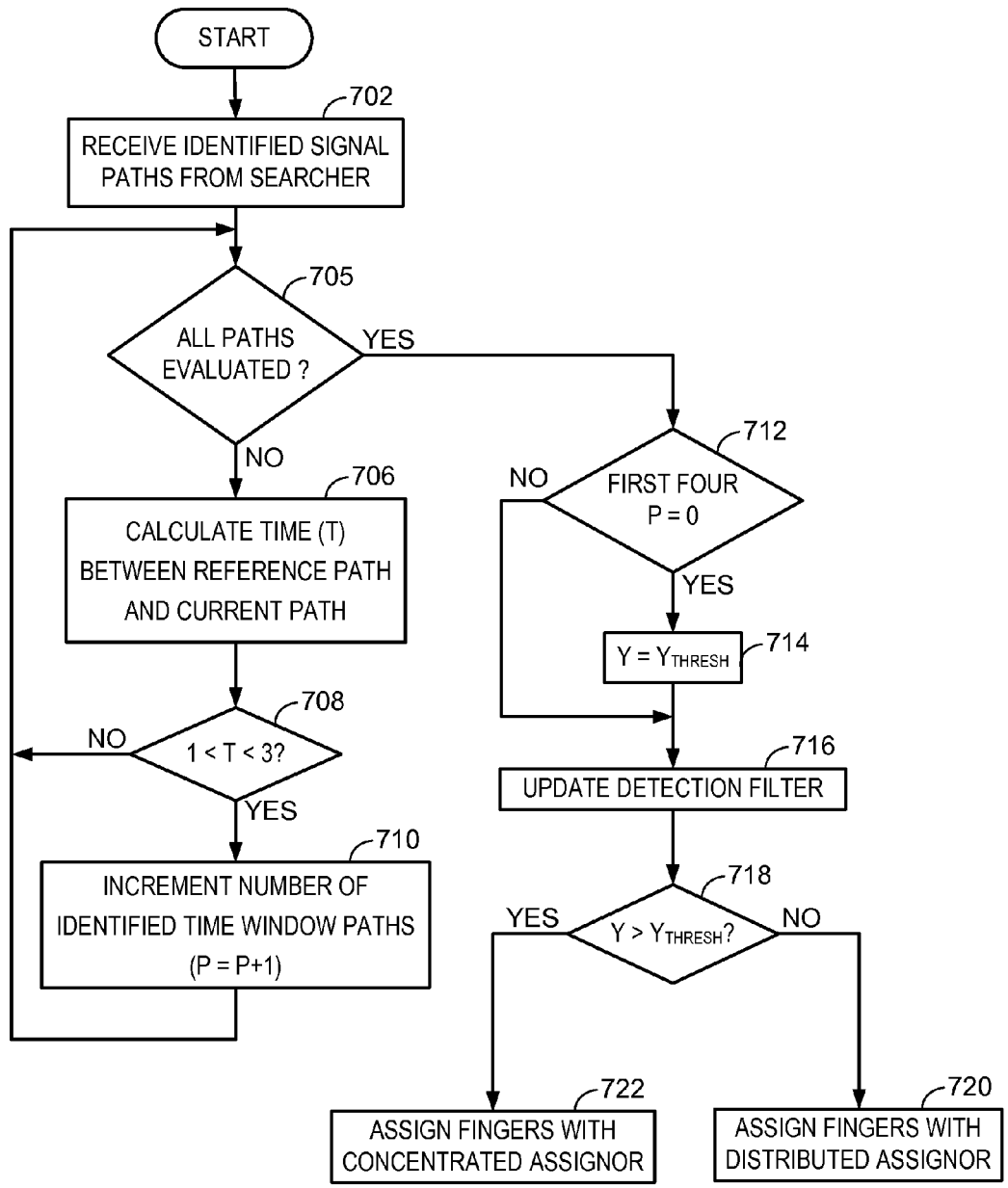
FIG. 7 is a flow chart of a method of assigning rake fingers in accordance with the exemplary embodiment.

FIG. 7 is a flow chart of a method of assigning rake fingers in accordance with the exemplary embodiment. The method may be performed by any combination of hardware, software and/or firmware. In the exemplary embodiment, the method is performed by an access terminal 112 communicating in a WCDMA communication system.

At step 702, the identified signal paths 302-312 are received from the searcher 202. In the exemplary embodiment a list of identified signal paths 302-312 are stored in memory 120. Chip offsets from 0 to 307200 from the reference PN code are stored with the corresponding Ec/Io for each received version of the pilot signal in a table. The stored values, therefore, characterize the signal paths. The fat path detector 204 evaluates each signal path as described below.

At step 707 determines if all of the identified signal paths 302-312 have been evaluated. If all of the identified signal paths 302-312 have been evaluated, the method continues at a step 712. Otherwise, the method continues at step 706.

At step 706, the time (T) between the reference path 306 and the currently evaluated path is calculated. As explained above, the reference path 306 is the path where the pilot signal version with highest energy was received. Therefore, the reference path 306 is the path with the least channel loss. The time in chips between the reference path 306 and the current path is determined by calculating the difference between the stored chip offset values in the exemplary embodiment.

At step 708, it is determined whether T is between one and three chips. The absolute value of the time difference between the current path and the reference path 306 is compared to the time window of 1 to 3 chips. Accordingly, in the exemplary embodiment, the time window includes two time windows from −3 to −1 and from 1 to 3 chips from the strongest signal version (reference path 306). If T is not within the time window, the method returns to step 704 to determine if other identified paths need to be evaluated. Otherwise, the method continues at step 710.

At step 710, the number (P) of identified time window paths 304-312 is updated. As explained above, the identified time window paths are those identified signal paths that are within a time window. In the exemplary embodiment, the paths that are 3 or less chips from the reference path 306 are within the time window. The time window may be determined in units other than chips in some circumstances. After updating P, the method returns step 704 to determine if all of the paths have been evaluated.

At step 712, all the identified signal paths have been evaluated for the current wake occurrence and it is determined whether the first four P values after initialization are equal to zero. If the first four values are not equal to zero, the method continues at step 716. Otherwise the method continues at step 714 where the filter value is set to the threshold ($y(4) = Y_{THRESH}$). In the exemplary embodiment, filter output is forced to the threshold value when the P values indicate that the scattering channel has very low scattering. If several P values are zero, the likelihood increases that the channel is not a scattering channel and the signal paths include line of sight paths. When the P value is zero for several wake occurrences, there are no identified signals paths within the time window indicating that a fat path condition is unlikely. The adjusted filter value at, or below, the threshold allows the fat path detector to indicate a distributed signal path arrangement which results in a distributed finger assignment at step 720.

At step 716, P value is updated in the detection filter 502 for the current wake occurrence. The new value is applied to the detection filter 502 to produce a new value y for the current wake occurrence, n.

At step 718, the filter output value, y is compared to the threshold ($y_{THRESH}$). If y is greater than the threshold, ($y > y_{THRESH}$), the method continues to step 722 where remaining rake fingers are distributed in a concentrated assignment. Otherwise, the method continues at step 720.

At step 720, the rake fingers are assigned in a distributed arrangement. In the exemplary embodiment, rake fingers are assigned to the identified signal paths 302-312 and any remaining rake fingers are not assigned.

At step 722, the rake fingers are assigned in a concentrated distribution. In the exemplary embodiment, the rake fingers are assigned to the identified signal paths 302-312 and remaining rake fingers are assigned to time offsets between the identified signal paths 302-312. An exemplary method of performing step 722 is discussed below with reference to FIG. 8.

Figure 8:
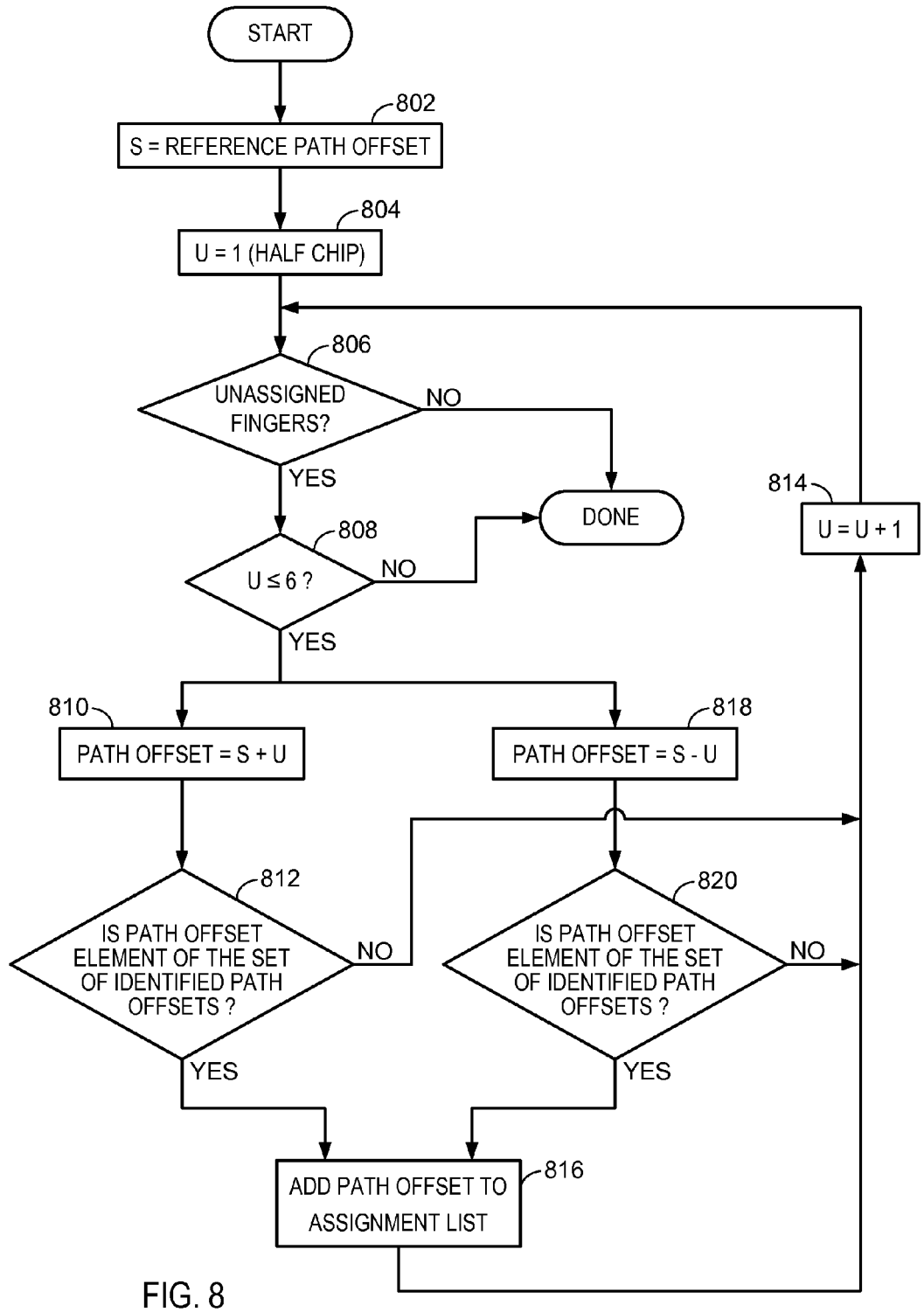
FIG. 8 is a flow chart of a method of assigning rake fingers in a concentrated distribution in accordance with the exemplary embodiment.

FIG. 8 is a flow chart of a method of assigning rake fingers in a concentrated distribution in accordance with the exemplary embodiment.

At step 802, s is set equal to the offset of the highest energy pilot version. Accordingly, s is set equal to the chip offset of the reference path 306 in the exemplary embodiment.

At step 804, u is set equal to 1 where the units of u are half chips.

At step 806, it is determined is unassigned fingers are remaining. If at least one finger remains unassigned, the method continues at step 808. Otherwise the methods proceeds to step 822.

At step 808, it is determined whether u is less than or equal to 6. Accordingly, it is determined whether us is equal to 3 chips. If u is less than or equal to 6, the method proceeds in parallel to steps 810 and 818. Otherwise, the method is proceeds to step 822 where the rake fingers are assigned.

At step 810, the path offset is set equal to the reference offset plus u (path offset=s+u). At step 818, the path offset is set equal to the reference offset minus u. Accordingly, multiples of ½ chip offsets are added and subtracted form the reference path offset at steps 810 and 818.

At steps 812 and 818, it is determined whether the path offsets are elements of the set of identified path offsets. Accordingly, it is determined whether the path offset is already listed as an identified signal path. If the path offset is not listed, the method continues at step 816 where it is added to the assignment list of signal paths. If the path offset is already listed in the set, the method continues to step 814 where u is incremented by 1.

In the exemplary embodiment, therefore, unassigned rake fingers are assigned between assigned rake fingers by ½ chip increments from the reference path 306 to assign fingers in a concentrated distribution. Accordingly, rake fingers are assigned to offsets where no signal path was identified resulting in increased performance when a signal path exists at one or more offsets that were not identified by the searcher as signal paths. The probability that a rake finger will receive a signal at an offset where no path was identified by the searcher increases as the scattering increases in the channel. During fat path conditions, such as dense urban environments, the likelihood that a signal path exists between the identified signal paths increases significantly. In the exemplary embodiment, the concentrated finger assignment is applied during fat path conditions and a distributed finger assignment is applied otherwise where the distributed finger assignment is in accordance with convention finger assignment techniques. As a result, performance during states where the access terminal periodically awakes for sleep mode to demodulate a paging channel increases while minimizing the time the access terminal is awake thereby maximizing battery life.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. Computer readable media embodying a method of assigning rake receiver fingers, the computer readable media when executed by a processor causing the processor to execute the method comprising:
   identifying a plurality of identified signal paths from a transmitter to a receiver, the identified signals paths having time offsets; and
   assigning a rake receiver finger of the rake receiver to a time offset between two of the identified signal path time offsets in accordance with a concentration of signal paths from the transmitter to the rake receiver, wherein said time offset is different than the time offsets of each of the plurality of identified signal paths.

2. Computer readable media embodying a method of assigning rake receiver fingers, the computer readable media when executed by a processor causing the processor to execute the method comprising:
   identifying a plurality of identified signal paths from a transmitter to an apparatus, the identified signals paths having time offsets;
   detecting a fat path condition based on a concentration of the plurality of identified signal paths; and
   assigning, when the fat path condition is detected, a concentrated finger assignment to assign at least one rake finger to a time offset between time offsets of two identified signal paths of the plurality of identified signal paths, wherein said time offset is different than the time offsets of each of the plurality of identified signal paths.

3. The computer readable media in accordance with claim 2, wherein detecting the fat path condition comprises detecting the fat path condition based on a number of identified signal paths within a time window.

4. Computer readable media embodying a method of assigning rake receiver fingers, the computer readable media when executed by a processor causing the processor to execute the method comprising:
   identifying a plurality of identified signal paths from a transmitter to an apparatus, the identified signals paths having time offsets;
   detecting a fat path condition based on a number of identified signal paths within a time window;
   assigning, when the fat path condition is detected, a concentrated finger assignment to assign at least one rake finger to a time offset between time offsets of two signal paths of the plurality of signal paths;
   generating a filter output based on a concentrated path indicator and a previous filter output; and
   generating a fat path indicator indicating a fat path condition when the filter output is greater than a threshold.

5. Computer readable media in accordance with claim 4, the method further comprising determining the number of identified signal paths within a time window.

6. Computer readable media in accordance with claim 5, wherein generating the filter output occurs in accordance with:
   $y(n)=0.95y(n-1)+0.05P(n)$, where y is the filter output, n is a wake occurrence of an access terminal measured from an initialization of the access terminal, and P is the number of paths within a time window.

7. Computer readable media in accordance with claim 4, wherein the generating the filter output occurs using a Finite Impulse Response (FIR) filter.

8. Computer readable media in accordance with claim 7, wherein the FIR filter is configured to average the filter output values with previous filter output values.

9. Computer readable media embodying a method of assigning rake receiver fingers, the computer readable media when executed by a processor causing the processor to execute the method comprising:
   identifying a plurality of identified signal paths from a transmitter to an apparatus, the identified signals paths having time offsets;
   detecting a fat path condition based on a concentration of the plurality of identified signal paths; and
   assigning, when the fat path condition is detected, a concentrated finger assignment to assign at least one rake finger to a time offset between time offsets of two signal paths of the plurality of signal paths, wherein the assigning further comprises assigning rake fingers to time offsets of identified signal paths and to time offsets at half chip increments from a reference signal path.

10. Computer readable media embodying a method of assigning rake receiver fingers, the computer readable media when executed by a processor causing the processor to execute the method comprising:
    identifying a plurality of identified signal paths from a transmitter to the apparatus, the identified signals paths having time offsets;
    detecting a fat path condition based on a concentration of the plurality of identified signal paths; and
    assigning, when the fat path condition is detected, a concentrated finger assignment to assign at least one rake finger to a time offset between time offsets of two signal paths of the plurality of signal paths wherein the assigning further comprises assigning rake fingers only to time offsets of identified signal paths when the detecting the fat path condition indicates a distributed signal path condition.

11. Computer readable media embodying a method of assigning rake receiver fingers, the computer readable media when executed by a processor causing the processor to execute the method comprising:
- identifying an energy and a relative time shift for each of a plurality of pilot signal versions of a pilot signal transmitted from a transmitter to a rake receiver system to identify a plurality of identified signal paths from the transmitter to the rake receiver system;
- generating a filter value based on a previous filter value and based on a number of identified signal paths within a time window from a reference signal path corresponding to a highest energy pilot signal version;
- indicating a fat path condition when the filter value is greater than a threshold; and
- assigning rake receiver fingers at time offsets between at least two time offsets of the identified paths when the fat path condition is indicated, wherein said assigned time offsets are different than the time offsets of each of the plurality of identified signal paths.

12. Computer readable media in accordance with claim 11, further comprising:
- determining the number of identified signal paths within a time window.

13. Computer readable media embodying a method of assigning rake receiver fingers, the computer readable media when executed by a processor causing the processor to execute the method comprising:
- identifying an energy and a relative time shift for each of a plurality of pilot signal versions of a pilot signal transmitted from a transmitter to a rake receiver system to identify a plurality of identified signal paths from the transmitter to the rake receiver system;
- generating a filter value based on a previous filter value and based on a number of identified signal paths within a time window from a reference signal path corresponding to a highest energy pilot signal version;
- indicating a fat path condition when the filter value is greater than a threshold;
- assigning rake receiver fingers at time offsets between at least two time offsets of the identified paths when the fat path condition is indicated; and
determining the number of identified signal paths within a time window, generating the filter value is in accordance with:
$y(n)=0.95y(n-1)+0.05P(n)$, where y is the filter output, n is a wake occurrence of an access terminal measured from an initialization of the access terminal, and P is the number of identified signal paths within the time window.

14. Computer readable media in accordance with claim 13, wherein assigning rake receiver fingers further comprises assigning rake fingers to time offsets of identified signal paths and to time offsets at half chip increments from a reference signal path.

15. Computer readable media embodying a method of assigning rake receiver fingers, the computer readable media when executed by a processor causing the processor to execute the method comprising:
- identifying a plurality of signal paths from a transmitter to the apparatus, the signals paths having time offsets from a reference signal path;
- detecting a fat path condition based on a concentration of the plurality of signal paths within a time window; and
- assigning, when the fat path condition is detected, at least one rake finger to a time offset between time offsets of two identified signal paths of the plurality of identified signal paths, wherein said time offset is different than the time offsets of each of the plurality of identified signal paths.

16. Computer readable media embodying a method of assigning rake receiver fingers, the computer readable media when executed by a processor causing the processor to execute the method comprising:
- identifying a plurality of signal paths from a transmitter to the apparatus, the signals paths having time offsets from a reference signal path;
- detecting a fat path condition based on a concentration of the plurality of signal paths within a time window, the detecting comprising:
  - counting a number of identified signal paths within the time window;
  - evaluating the number of identified signal paths within the time window;
  - generating a filter output based on the concentrated path indicator and a previous filter output; and
  - evaluating the filter output to generate a fat path indicator indicating a fat path condition when the filter output is greater than a threshold; and
- assigning, when the fat path condition is detected, at least one rake finger to a time offset between time offsets of two signal paths of the plurality of signal paths.

17. Computer readable media embodying a method of operating in a wide-band code division multiple access (WCDMA) communication system, the computer readable media when executed by a processor causing the processor to execute the method comprising:
- processing a plurality of signal versions of a signal transmitted from a base station to an access terminal and received by a plurality of rake receiver fingers;
- identifying an energy and a relative time shift for each of a plurality of pilot signal versions of a pilot signal transmitted from a transmitter to the access terminal to identify a plurality of identified signal paths from the base station to the access terminal;
- generating a filter value based on a previous filter value and based on a number of identified signal paths within a time window from a reference signal path corresponding to a highest energy pilot signal version;
- indicating a fat path condition when the filter value is greater than a threshold; and
- assigning rake receiver fingers at time offsets between at least two time offsets of the identified paths when the fat path condition is indicated.

18. Computer readable media in accordance with claim 17, the method further comprising:
- determining the number of identified signal paths within a time window.

19. Computer readable media in accordance with claim 17, wherein generating the filter value is in accordance with:
$y(n)=0.95y(n-1)+0.05P(n)$, where y is the filter output, n is a wake occurrence of the access terminal measured from an initialization of the access terminal, and P is the number of identified signal paths within the time window.

20. Computer readable media in accordance with claim 19, wherein assigning rake receiver fingers comprises assigning rake fingers to time offsets of identified signal paths and to time offsets at half chip increments from a reference signal path.

21. Computer readable media in accordance with claim 17, wherein assigning rake receiver fingers further comprises assigning rake fingers only to time offsets of identified signal paths when the a distributed signal path condition is indicated.

22. Computer readable media embodying a method of assigning rake receiver fingers, the computer readable media when executed by a processor causing the processor to execute the method comprising:
    identifying a plurality of identified signal paths from a transmitter to the apparatus, the identified signals paths having time offsets from a reference path;
    detecting a fat path condition based on a concentration of the plurality of identified signal paths; and
    assigning, when the fat path condition is detected, a concentrated finger assignment to assign at least one rake finger to a time offset between time offsets of two identified signal paths of the plurality of identified signal paths, wherein said time offset is different than the time offsets of each of the plurality of identified signal paths.

23. Computer readable media in accordance with claim 22, where the detecting comprises detecting the fat path condition based on a number of identified signal paths within a time window.

24. Computer readable media embodying a method of assigning rake receiver fingers, the computer readable media when executed by a processor causing the processor to execute the method comprising:
    identifying a plurality of identified signal paths from a transmitter to the apparatus, the identified signals paths having time offsets from a reference path;
    detecting a fat path condition based on a number of identified signal paths within a time window, wherein the detecting comprises:
        generating a filter output based on a concentrated path indicator and a previous filter output; and
        generating a fat path indicator indicating a fat path condition when the filter output is greater than a threshold; and
    assigning, when the fat path condition is detected, a concentrated finger assignment to assign at least one rake finger to a time offset between time offsets of two signal paths of the plurality of signal paths.

25. Computer readable media in accordance with claim 24, wherein the detecting further comprises:
    counting the number of identified signal paths within the time window.

26. Computer readable media in accordance with claim 25, wherein the generating the concentrated path indicator comprises:
    generating a concentrated path indicator value of one when the number of identified signal paths within three chips of the reference path is greater than or equal to six and a concentrated path indicator value of zero, otherwise.

27. Computer readable media in accordance with claim 26, wherein the generating the filter output comprises generating the filter output in accordance with $y(n)=0.95y(n-1)+0.05P(n)$, where y is the filter output, n is a wake occurrence of an access terminal measured from an initialization of the access terminal, and P is the number of identified signals paths within the time window.

28. Computer readable media in accordance with claim 26, wherein the assigning comprises assigning rake fingers to time offsets of identified signal paths and to time offsets at half chip increments from the reference signal path.

* * * * *